United States Patent
Gupta et al.

(10) Patent No.: US 10,364,305 B2
(45) Date of Patent: Jul. 30, 2019

(54) POLYOLEFIN AND A PROCESS FOR PREPARING THE SAME

(71) Applicant: Reliance Industries Limited, Mumbai (IN)

(72) Inventors: Virendrakumar Gupta, Navi Mumbai (IN); Yogeshwar Narayanrao Thakare, Amravati (IN); Bhavesh Kiritbhai Desai, Guntur (IN); Suketu Vakil, Mumbail (IN)

(73) Assignee: Reliance Industries Limited, Mumbai (IN)

( * ) Notice: Subject to any disclaimer, the term of this patent is extended or adjusted under 35 U.S.C. 154(b) by 19 days.

(21) Appl. No.: 15/311,983

(22) PCT Filed: May 20, 2015

(86) PCT No.: PCT/IB2015/053702
§ 371 (c)(1),
(2) Date: Nov. 17, 2016

(87) PCT Pub. No.: WO2015/177733
PCT Pub. Date: Nov. 26, 2015

(65) Prior Publication Data
US 2018/0312615 A1 Nov. 1, 2018

(30) Foreign Application Priority Data
May 20, 2014 (IN) .......................... 1696/MUM/2014

(51) Int. Cl.
*C08F 4/64* (2006.01)
*C08F 110/06* (2006.01)
*C08J 9/30* (2006.01)

(52) U.S. Cl.
CPC .............. *C08F 110/06* (2013.01); *C08J 9/30* (2013.01); *C08J 2323/12* (2013.01)

(58) Field of Classification Search
CPC ................ C08F 110/06; C08F 2500/12; C08F 2500/15; C08F 4/64
See application file for complete search history.

(56) References Cited

U.S. PATENT DOCUMENTS

| | | | |
|---|---|---|---|
| 4,379,860 A * | 4/1983 | Fickel | A01N 25/10 521/61 |
| 4,728,704 A | 3/1988 | Chadwick et al. | |
| 5,106,806 A | 4/1992 | Job | |
| 6,395,670 B1 | 5/2002 | Morini et al. | |
| 6,468,938 B1 | 10/2002 | Govoni et al. | |
| 7,183,332 B2 * | 2/2007 | Ferraro | C08F 10/00 521/142 |
| 8,222,357 B2 | 7/2012 | Chen | |
| 9,683,062 B2 * | 6/2017 | Gaddi | C08J 9/0066 |
| 2014/0148564 A1 * | 5/2014 | Liguori | C08F 210/16 526/124.2 |

FOREIGN PATENT DOCUMENTS

| | | | | |
|---|---|---|---|---|
| EP | 2350143 A | 8/2011 | | |
| WO | WO 2015/059117 A1 * | 4/2015 | | C08F 10/06 |

\* cited by examiner

*Primary Examiner* — Rip A Lee
(74) *Attorney, Agent, or Firm* — Fish IP Law, LLP

(57) ABSTRACT

The present disclosure relates to a polyolefin characterized by melt flow index ranging from 1 and 100 g/10 min; tacticity ranging from 97 and 99.5%; and porosity ranging from 0.1 to 0.4 cm3/g. The present disclosure also relates to a simple and economic method for preparing the polyolefin.

19 Claims, No Drawings

POLYOLEFIN AND A PROCESS FOR PREPARING THE SAME

FIELD OF THE DISCLOSURE

The present disclosure relates to polyolefins and a process for preparing the same.

BACKGROUND

Polyolefins like polyethylene (PE) and polypropylene (PP) cover more than 60% of the worldwide thermoplastic market, mainly due to their wide applications, including grocery bags, containers, toys, adhesives, home appliances, engineering plastics, automotive parts, medical applications and the like.

Porous polyolefins have a higher market value as they are very useful in the preparation of high impact rubber, which is used in the automobile industry. During preparation of high impact rubber, deposition of polymer inside the polypropylene resin is always preferred as compared to deposition on the resin surface as it makes the resin sticky and less movable, thus, interrupting plant operation. The porous morphology of polypropylene facilitates incorporation of polyethylene not only on the surface but also inside the pores which results in rubber formation with high impact resistance.

In order to meet the global demand of these polypropylene various catalysts such as Ziegler-Natta (ZN) catalysts, metallocene and the like have been used. Amongst these, Ziegler-Natta (ZN) catalysts are the preferred catalysts, mainly due to their capacity to produce high amounts of polyolefin at relatively low temperature and pressure.

However, for the preparation of polypropylene with porous morphology, Ziegler-Natta catalysts needs adequate control on polymerization kinetics to avoid formation of low particle size resins called fines.

Accordingly, several attempts were made in the past to prepare a Ziegler-Natta catalyst composition using different combinations of pro-catalysts, co-catalysts and external electron donors to obtain highly porous polymer resins.

However, it is observed that modification in the composition of the pro-catalyst containing a solid support and internal donors provides a degree of control on polymerization kinetics.

For instance, U.S. Pat. No. 6,395,670 suggests a catalyst for the polymerization of olefins. The catalyst comprises anhydrous magnesium dichloride, titanium compound and electron donors. Further, U.S. Pat. No. 6,395,670 suggests that the use of at least two electron donors in combination with anhydrous magnesium dichloride and titanium compound provides a balance between hydrogen response and isotacticity of the catalyst. The electron donors used in U.S. Pat. No. 6,395,670 include a compound containing two or more ether and/or ester groups.

U.S. Pat. No. 6,468,938 suggests pre-polymerized catalyst components for co-polymerization of olefins $CH_2=CHR$. The catalyst components disclosed by U.S. Pat. No. 6,468,938 contain Ti, Mg, halogen and an electron donor compound, being capable of yielding, under standard polymerization conditions, a propylene homopolymer having insolubility in xylene at 25° C.

U.S. Pat. No. 8,222,357 suggests a pro-catalyst containing a multiple internal electron donor with at least two components, one of which is a silyl ester. Other components of the mixed internal electron donor include aromatic acid ester, di-ether and combinations thereof.

From the forgoing, it is observed that modifications in the pro-catalyst result in a Ziegler-Natta catalyst composition having lower polydispersity with adequate hydrogen response and controlled reaction kinetics. However, the aforementioned compositions failed to produce polymers having the desired melt flow index and porosity matrix required for producing high rubber polypropylene grades.

Therefore, there exists a need for a process for preparing a polymer having optimum pore size distribution and controlled porosity. There is also a need for a Ziegler-Natta catalyst composition having the required degree of control over the polymerization kinetics.

Objects

Some of the objects of the present disclosure, which at least one embodiment is able to achieve, are discussed herein below.

It is an object of the present disclosure to provide a polypropylene with porous morphology suitable for incorporation of polyethylene to prepare high impact rubber.

It is another object of the present disclosure to provide a polymerization process for preparing a porous polypropylene using a Ziegler-Natta catalyst composition.

It is yet another object of the present disclosure to provide a polymerization process having controlled reaction kinetics.

It is still another object of the present disclosure to provide a polyolefin having controlled poly-dispersity and improved hydrogen response.

It is a further object of the present disclosure to provide a polyolefin having controlled pore size distribution and higher porosity.

It is a still further object of the present disclosure to provide a polyolefin having improved impact polymer grades.

Other objects and advantages of the present disclosure will be more apparent from the following description which is not intended to limit the scope of the present disclosure.

SUMMARY

In accordance with one aspect of the present disclosure there is provided a polyolefin characterized by:
  a. melt flow index ranging from 1 to 100 g/10 min;
  b. tacticity ranging from 97 to 99.5%; and
  c. porosity ranging from 0.1 to 0.4 cm³/g.

In accordance with another aspect of the present disclosure there is provided a process for preparing a polyolefin, said process comprising the following steps;
  a. Obtaining a Ziegler-Natta catalyst composition comprising:
    at least one pro-catalyst comprising:
      i. a morphologically modified magnesium alkoxide as a support;
      ii. at least one titanium halide;
      iii. at least one first internal donor and at least one second internal donor; and
      iv. at least one hydrocarbon medium,
    at least one organo-aluminum compound as a co-catalyst; and
    at least one external donor comprising an organo-silane compound and a carboxylic acid ester,
  b. mixing the Ziegler-Natta catalyst composition and at least one monomer in the presence of at least one vehicle to obtain a monomer catalyst mixture, wherein the amount of monomer ranges from 5 to 50 kg per gm of said Ziegler-Natta catalyst, c. polymerizing the mixture at a temperature ranging from 60 to 100° C., at a pressure ranging from 3 to 40 kg/cm$^2$ in the presence of hydrogen gas to obtain the polyolefin having
melt flow index from 1 to 100 g/10 min;
tacticity from 97 to 99.5%; and
porosity from 0.1 to 0.4 cm$^3$/g.

The Ziegler-Natta catalyst composition can be characterized by:

i. the molar ratio of said magnesium alkoxide to the titanium halide ranges from 1:10 to 1:20;
ii. the molar ratio of said magnesium alkoxide to the first internal donor ranges from 1:0.1 to 1:5;
iii. the molar ratio of the elemental titanium to the elemental aluminum present in said organo-aluminum compound in said catalyst, ranges from 1:1 to 1:250; and
iv. the molar ratio of the external donor to the elemental aluminum, present in said organo-aluminum compound ranges from 1:1 to 1:50.

The said morphologically modified magnesium alkoxide can be characterized by:

a. mean particle size in the range of 20 to 70μ;
b. surface area in the range of 1 to 30 m$^2$/g;
c. circularity in the range of 0.5 to 0.9;
d. macro-pore size distribution in the range of 40 to 80%;
e. meso-pore size distribution in the range of 15 to 60%; and
f. micro-pore size distribution in the range of 2 to 10%.

Definition

In the context of the present invention the term:—
"macro porosity" refers to a pore size greater than 50 nm in diameter.
"meso porosity" refers to pore size greater than 2 nm and less than 50 nm in diameter.
"micro porosity" refers to pore size smaller than 2 nm in diameter.

Pore size distribution and surface area is measured by nitrogen adsorption-desorption method by Sorptomatic 1990 instrument. Circularity is measured by image-j software. Brunauer-Emmett-Teller (BET) method is used for Surface Area Analysis and Barrett-Joyner-Halenda (BJH) method is used for Pore Size distribution.

Melt Flow Index is an indirect measure of polymer molecular weight. It is measured as the amount of polymer flowed through an aperture under a load of 2.16 Kg and at a temperature of 230° C. in 10 minutes, for polypropylene.

Tacticity is the measure of the amount isotactic polypropylene available in the total polypropylene, and it is reported in percentage. Xylene Soluble fraction is extracted from the total mass and Xylene insoluble and is reported as the isotactic polypropylene.

Porosity of the polypropylene resin is the amount of plasticizer adsorbed by the polymer per unit mass, and reported as ml/g. The amount of adsorbed plasticizer reflects the pore volume available in the polymer resin. For characterization, polymer resin is saturated with di (2-ethyl hexyl) phthalate, then the un-adsorbed fraction is removed by centrifugation and the amount adsorbed per unit mass of polymer is reported as porosity.

DETAILED DESCRIPTION

Several molded articles and films are manufactured using a variety of polymers. However, it is observed that the currently available polymers are brittle and do not possess the required impact strength. Therefore, to improve the impact strength of polymers, they are usually blended with impact modifiers. In addition, it is also observed that polymer resins prepared using the conventional methods do not possess the required porosity for incorporating impact modifiers.

Therefore, in accordance with the present disclosure there is provided a process for preparing poly-olefins having improved melt flow rate, pore size distribution and porosity.

The process involves the following steps:

In the initial step, a Ziegler-Natta catalyst composition is mixed with one or more monomers in the presence of at least one vehicle to obtain a monomer catalyst mixture. The amount of monomer ranges from 5 to 50 kg/gm of said Ziegler-Natta catalyst. In this case, the monomer is in gaseous form and is added to the reaction mixture containing the catalyst under pressure.

In the next step, the mixture is polymerized at a temperature of 60 to 100° C. and at a pressure of 3 to 40 kg/cm$^2$ in the presence of 50 to 500 mmole of hydrogen gas to obtain polyolefin.

The monomer used for preparing the polyolefin of the present disclosure includes but is not limited to propylene.

The Ziegler-Natta catalyst composition used in the present disclosure contains at least one pro-catalyst, at least one co-catalyst, at least one external donor and at least one hydrocarbon medium.

The pro-catalyst used in the Ziegler-Natta catalyst composition of the present disclosure contains a morphologically modified magnesium alkoxide as a support, at least one titanium halide as a catalyst, at least one first internal donor, at least one second internal donor and at least one hydrocarbon medium. The molar ratio of the morphologically modified magnesium alkoxide to the titanium halide ranges from 1:10 to 1:20, whereas the molar ratio of the morphologically modified magnesium alkoxide to the first internal donor ranges from 1:0.1 to 1:5.

The morphologically modified magnesium alkoxide used in the pro-catalyst of the present disclosure is characterized by mean particle size in the range of 20 to 70μ; surface area in the range of 1 to 30 m$^2$/g; circularity in the range of 0.5 to 0.9; macro pore size distribution in the range of 40 to 80%; meso pore size distribution in the range of 15 to 60%; and micro pore size distribution in the range of 2 to 10%.

The magnesium alkoxide is selected from the group consisting of magnesium ethoxide, magnesium methoxide, magnesium propoxide, magnesium iso-propoxide, magnesium butoxide, magnesium iso-butoxide and combinations thereof.

The titanium halide used in the pro-catalyst of the present disclosure includes but is not limited to titanium tetrachloride, titanium bromide, titanium iodide, titanium fluoride and combination thereof.

In accordance with one embodiment of the present disclosure the magnesium alkoxide is magnesium ethoxide and the titanium halide is titanium chloride.

In accordance with one of the embodiment of the present disclosure the first internal donor is at least one ether and the second internal donor is at least one organic acid ester.

The first internal donor is at least one 1, 3-diether selected from the group consisting of dialkyl diether, diaryl diether, alkyl aryl diether, dicycloalkyl diether, alkyl cycloalkyl diether The first internal donor used in the pro-catalyst of the present disclosure includes but is not limited to 1,1-bis (methoxymethyl)-2,3,6,7-tetrafluoroindene; 1,1-bis (methoxymethyl)-4,7-dimethylindene; 1,1-bis (methoxymethyl)-3,6-dimethylindene; 1,1-bis (methoxymethyl)-4-phenylindene; 1,1-bis (methoxymethyl)-4-phenyl-2-methylindene; 1,1-bis (methoxymethyl)-4-cyclohexylindene; 1,1-bis (methoxymethyl)-7-(3,3,3-trifluoropropyl)indene; 1,1-bis (methoxymethyl)-7-trimethylsilylindene; 9,9-bis (methoxymethyl)-fluorene; 9,9-bis (methoxymethyl)-2,3,6,7-tetramethylfluorene; 9,9-bis (methoxymethyl)-2,3,4,5,6,7-hexafluorofluorene; 9,9-bis (methoxymethyl)-2,3-benzofluorene, 9,9-bis (methoxymethyl)-2,7-diisopropylfluorene; 9,9-bis (methoxymethyl)-2,7-dicyclopentylfluorene; 9,9-bis (1'-isopropoxy-n-butyl-4,5-diphenylfluorene; 9,9-bis (1'-methoxyethyl)fluorene; 9-methoxymethyl-9-pentoxymethylfluorene; 9-methoxymethyl-9-ethoxymethylfluorene; 9-methoxymethyl-9-(1'-methoxyethyl)-fluorene; 1,1-bis (methoxymethyl)-2,5-cyclohexadiene, 1,1-bis (methoxymethyl) benzonaphthene; 9,9-bis(methoxymethyl)-1,4-methanedihydronaphthalene; and 9,9-bis (methoxymethyl)-9,10-dihydroanthracene.

The procatalyst of the present disclosure is obtained by treating the first internal donor containing magnesium alkoxide precursor with a mixture of titanium tetrahalide and the second internal donor or organic acid chloride that in-situ generates said second internal donor.

The second in-situ generated internal donor is at least one ester selected from the group consisting of organic acid esters having 2 to about 30 carbon atoms such as ethyl benzoate, n-butyl benzoate, p-methoxy ethylbenzoate, p-ethoxy ethylbenzoate, iso butyl benzoate, ethyl p-toluate, diethyl phthalate, di-n-propyl phthalate, di-n-butyl phthalate, do-n-pentyl phthalate, di-i-pentyl phthalate, bis (2-ethylhexyl)phthalate, ethyl-isobutyl phthalate, ethyl-n-butyl phthalate, di-n-hexyl phthalate, and di-isobutyl phthalate.

In one of the embodiments the first internal donor is 9,9-bis (methoxymethyl) fluorene and the second internal donor is ethyl benzoate.

The hydrocarbon medium used in the pro-catalyst of the present disclosure includes but is not limited to pentane, hexane, heptane, octane, nonane, decane, mineral oil and varsol.

The hydrocarbon medium used in the procatalyst of present disclosure can be hexane.

The co-catalyst used in accordance with the present disclosure contains one or more organo-aluminum compounds, which includes but is not limited to triethyl aluminum, tridecylaluminum, tri-n-butyl aluminum, tri-isopropyl aluminum, tri-isoprenyl aluminum, tri-isobutyl aluminum hydride, ethyl aluminumsesquichloride, diethyl aluminum chloride, di-isobutyl aluminum chloride, triphenyl aluminum, tri-n-octyl aluminum and tri-n-decyl aluminum.

The molar ratio of elemental titanium to elemental aluminum, present in the organo-aluminum compound in the catalyst, ranges from 1:1 to 1:250.

In accordance with one of the embodiment of the present disclosure the organo-aluminum compound is triethyl aluminum.

The external donor used in the Ziegler-Natta catalyst composition of the present disclosure includes organo-silane compound and carboxylic acid ester.

The organo-silane compound used in the external donor of the present disclosure includes but is not limited to di-phenyl dimethoxy silane, phenyl tri-methoxy silane, phenyl ethyl di-methoxy silane, phenyl methyl di-methoxy silane, tri-methyl methoxy silane, iso-butyl tri-methoxy silane, di-iso-butyl methoxy silane, di-cyclo-pentyl-dimethoxy silane, di-t-butyl dimethoxy silane, di-cyclo-pentyl dimethoxy silane, cyclo-hexyl methyl di-methoxy silane, di-cyclo hexyl di-methoxy silane and combinations thereof.

The carboxylic acid ester compound used in the external donor of the present disclosure includes but is not limited to of C1-4 alkyl benzoates and C1-4 ring alkylated derivatives thereof.

Typically, the carboxylic acid ester includes but is not limited to methyl benzoate, ethyl benzoate, propyl benzoate, methyl p-methoxybenzoate, methyl p-ethoxybenzoate, ethyl p-methoxybenzoate, ethyl p-ethoxybenzoate, p-iso propoxy ethyl benzoate and combinations thereof.

In various embodiments of the present disclosure the external donor includes ethyl benzoate, ethyl p-ethoxybenzoate and p-iso propoxy ethyl benzoate in combination with organosilane compounds.

The molar ratio of the external donor to the elemental aluminum, present in said organo-aluminum compound ranges from 1:1 to 1:50.

In accordance with the present disclosure there is also provided a poly-olefin, having melt flow index ranging from 1 to 100 g/10 min; tacticity ranging from 97 to 99.5%; and Porosity ranging from 0.1 to 0.4 $cm^3/g$.

The present disclosure is further described in the light of the following examples which are set forth for illustration purpose only and not to be construed for limiting the scope of the disclosure.

Example 1: Process for the Preparation of Polyolefin

Step I: Preparation of Ziegler-Natta Catalyst Composition:

0.41 mole of magnesium, 4 mole of ethanol and 0.0027 mole of $TiCl_4$ were mixed in a reactor to obtain a mixture. The temperature of the obtained mass was then increased stepwise to 80° C. under reflux conditions, while controlling the reaction. It took 8-10 hrs for completion of the reaction. The mass was dried at 100° C. under nitrogen to get free flowing powder of magnesium alkoxide. The obtained magnesium alkoxide has mean particle size of 20 to 70μ; surface area of 1 to 30 $m^2/g$; circularity in the range of 0.5 to 0.9; macro pore size distribution in the range of 40 to 60%; meso pore size distribution in the range of 15 to 60%; and micro pore size distribution in the range of 2 to 10%.

0.087 mole of magnesium alkoxide was mixed with 1.05 mole of $TiCl_4$ and equivolume chlorobenzene at a temperature of 20° C., and then 0.0177 moles of 9,9-bis (methoxymethyl)-fluorene was added to obtain dispersion. After reaction, the excess of mixed solvent ($TiCl_4$ and chlorobenzene) was then decanted. Again equi-volume mixture of $TiCl_4$ and chlorobenzene is added and allowed to react, and decanted after the completion of the reaction. Similar volume of $TiCl_4$ and chlorobenzene along with 0.004 mole of benzoyl chloride was added in the mixture to obtain a pro-catalyst. In this step, a second internal donor ethyl benzoate was formed in-situ.

70 mg of pro-catalyst was then mixed with triethyl aluminum co-catalyst in the molar ratio of 250 to obtain an activated catalyst. The activated catalyst so prepared was contacted with mixed external donor, in the molar ratio of 5.0, comprising organo-silane compound and carboxylic acid ester to obtain the Ziegler-Natta catalyst composition.

Step II: Preparation of Poly-Olefin

The Ziegler-Natta catalyst composition so prepared was charged into the reactor containing propylene. 240 ml of hydrogen as a chain terminating agent (CTA) was charged into the reactor. The polymerization reaction was carried out at 70° C. and at 5 $Kg/cm^2$ pressure and allowed to react till completion of the reaction i.e. for 2 hrs. The resultant polypropylene is taken out and dried before further characterization. Results are shown in Table-1.

Example 2: Process for the Preparation of Polyolefin

Step I: Preparation of Ziegler-Natta Catalyst Composition:

0.41 mole of magnesium was reacted with 4 mole of ethanol in presence of 0.0212 mole of magnesium dichloride.

Other steps are followed as per example—1 to obtain porous polypropylene as shown in Table-1.

TABLE 1

Comparative performance of catalyst and properties of resultant polypropylene with different initiators.

| | Ziegler-Natta catalytic composition with diether as internal donor | | |
|---|---|---|---|
| Comparative Data | Iodine modified Mg-alkoxide precursor (Conventional) | $TiCl_4$ modified Mg-alkoxide precursor (Present disclosure) | $MgCl_2$ modified Mg-alkoxide precursor (Present disclosure) |
| Catalyst Activity, KgPP/gcat | 7.7 | 8.9 | 8.7 |
| Hydrogen Response (MFI), dg/min | 4.4 | 4.9 | 6.9 |
| Stereo-regularity by NMR, Wt. % | 92.9 | 98.5 | 98.6 |
| Product fines, Wt. % | 7.8 | 5.7 | 5.1 |
| Resin Porosity by DOP, ml/gm | 0.17 | 0.20 | 0.25 |

From the above Table 1, it is observed that the polyolefin obtained using the Ziegler-Natta catalyst as disclosed in the present disclosure has enhanced properties such as catalyst activity, melt flow index (MFI), tacticity and porosity as compared to those of the polyolefin obtained using the prior art catalyst.

The value of melt flow index (MFI) mentioned above is from bench scale. The same catalyst system gives melt flow index up to 100 g/10 min, when subjected to operating conditions similar to commercial plant.

TABLE 2

Table - 2: Characteristics of Ziegler-Natta catalyst compositions and polyolefin prepared using the Ziegler-Natta catalyst compositions of the present disclosure

| | CAT-1 | CAT-2 | CAT-3 | CAT-4 |
|---|---|---|---|---|
| Initiator | TiCl4 | TiCl4 | MgCl2 | MgCl2 |
| Ti, Wt. % | 2.2 | 2.2 | 2.5 | 2.5 |
| Mg, Wt. % | 17.5 | 17.5 | 16.1 | 16.1 |
| Cl, Wt. % | 43.7 | 43.7 | 49.8 | 49.8 |
| X, Wt. % | <1.0% | <1.0% | <1.0% | <1.0% |
| Y, Wt. % | 8.6 | 13.2 | 14.7 | 14.7 |
| Hydrogen, mmmolmmol | 150 | 150 | 150 | 150 |
| Silane, mmol | 1.8 | 1.7 | 2.0 | 2.0 |
| TEAL, mmol | 9.9 | 8.4 | 9.9 | 9.9 |
| Activity, Kg/g. cat | 8.5 | 8.9 | 8.7 | 8.3 |
| MFI, g/10 min | 5.5 | 4.9 | 6.9 | 6.1 |
| XS, Wt. % | 2.1 | 1.7 | 0.6 | 0.9 |
| Fines, Wt. % | 3.2 | 5.7 | 5.1 | 6.2 |
| Resin Porosity, ml/gm | 0.20 | 0.21 | 0.25 | 0.24 |

Wherein:
X—Monoester internal donor,
Y—Diether internal donor
MFI—Melt Flow Index (g/10 mins),
XS—Xylene Solubles, a measure of polymer tacticity (wt. %). The Xylene Soluble fraction is extracted from the total mass and the Xylene insoluble has been reported in Table 2 as the isotactic polypropylene (XS, Wt. %)
Fines—Polymer resin weight fraction below 75 micron From the above Table 2, it is observed that the polyolefin obtained using the Ziegler-Natta catalyst as disclosed in the present disclosure, has the desired and acceptable properties.

Technical Advancement and Economic Significance

The present disclosure has the following advantages:

Provides polypropylene with higher porosity, which is required for the production of high rubber impact co-polymers, where high porosity homopolymer matrix accommodate more rubber inside it.

The catalyst system has high hydrogen response, and so it can produce a polymer with high MFI (up to 100 gm/10 mins).

The catalyst composition is capable of controlling the reaction kinetics of an olefin polymerization reaction.

The embodiments herein and the various features and advantageous details thereof are explained with reference to the non-limiting embodiments in the description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The use of the expression "at least" or "at least one" suggests the use of one or more elements or ingredients or quantities, as the use may be in the embodiment of the invention to achieve one or more of the desired objects or results.

The numerical values given for various physical parameters, dimensions and quantities are only approximate values and it is envisaged that the values higher than the numerical value assigned to the physical parameters, dimensions and quantities fall within the scope of the invention and the claims unless there is a statement in the specification to the contrary.

While certain embodiments of the inventions have been described, these embodiments have been presented by way of example only, and are not intended to limit the scope of the inventions. Variations or modifications in the process or compound or formulation or combination of this invention, within the scope of the invention, may occur to those skilled in the art upon reviewing the disclosure herein. Such variations or modifications are well within the spirit of this invention. The accompanying claims and their equivalents are intended to cover such forms or modifications as would fall within the scope and spirit of the invention.

The invention claimed is:

1. A process for preparing a polyolefin, said process comprising the following steps;
   a. obtaining a Ziegler-Natta catalyst composition comprising:
      at least one procatalyst comprising:
         i. a morphologically modified magnesium alkoxide as a support;
         ii. at least one titanium halide;
         iii. at least one first internal donor and at least one second internal donor; and
         iv. at least one hydrocarbon medium;
      at least one organoaluminum compound as a co-catalyst; and
      at least one external donor comprising an organosilane compound and a carboxylic acid ester,
   b. mixing the Ziegler-Natta catalyst composition and at least one monomer in the presence of at least one vehicle to obtain a monomer catalyst mixture, wherein the amount of monomer ranges from 5 to 50 kg per gm of said Ziegler-Natta catalyst composition, and
   c. polymerizing the monomer catalyst mixture at a temperature ranging from 60 to 100° C., at a pressure ranging from 3 to 40 kg/cm$^2$ in the presence of hydrogen gas to obtain the polyolefin having:
      a melt flow index from 1 to 100 g/10 min;
      a tacticity from 97 to 99.5%; and
      a porosity from 0.1 to 0.4 cm$^3$/g.

2. The process as claimed in claim 1, wherein said Ziegler-Natta catalyst composition has:
   i. a molar ratio of said morphologically modified magnesium alkoxide to the titanium halide ranges from 1:10 to 1:20;
   ii. a molar ratio of said morphologically modified magnesium alkoxide to the first internal donor ranges from 1:0.1 to 1:5;
   iii. a molar ratio of elemental titanium to elemental aluminum present in said organoaluminum compound, ranges from 1:1 to 1:250; and
   iv. a molar ratio of the external donor to elemental aluminum, present in said organoaluminum compound ranges from 1:1 to 1:50.

3. The process as claimed in claim 1, wherein said morphologically modified magnesium alkoxide has:
   a. mean particle size in a range of 20 to 70µ;
   b. surface area in a range of 1 to 30 m$^2$/g;
   C. circularity in a range of 0.5 to 0.9;
   d. macro-pore size distribution in a range of 40 to 80%;
   e. meso-pore size distribution in a range of 15 to 60%; and
   f. micro-pore size distribution in a range of 2 to 10%.

4. The process as claimed in claim 1, wherein the morphologically modified magnesium alkoxide is at least one selected from the group consisting of magnesium ethoxide, magnesium methoxide, magnesium propoxide, magnesium iso-propoxide, magnesium butoxide and magnesium iso-butoxide and the at least one titanium halide is at least one selected from the group consisting of titanium tetrachloride, titanium tetrabromide, titanium tetraiodide and titanium tetrafluoride.

5. The process as claimed in claim 1, wherein the morphologically modified magnesium alkoxide is magnesium ethoxide and the titanium halide is titanium tetrachloride.

6. The process as claimed in claim 1, wherein the at least one first internal donor is at least one ether and at least one second internal donor is at least one organic acid ester.

7. The process as claimed in claim 1, wherein the at least one first internal donor is at least one 1, 3-diether selected from the group consisting of dialkyl diether, diaryl diether, alkyl aryl diether, dicycloalkyl diether, and alkyl cycloalkyl diether.

8. The process as claimed in claim 7, wherein the at least one first internal donor is at least one selected from the group consisting of 1,1-bis (methoxymethyl)-2,3,6,7-tetrafluoroindene; 1,1-bis (methoxymethyl)-4,7-dimethylindene; 1,1-bis (methoxymethyl)-3,6-dimethylindene; 1,1-bis (methoxymethyl)-4-phenylindene; 1,1-bis (methoxymethyl)-4-phenyl-2-methylindene; 1,1-bis (methoxymethyl)-4-cyclohexylindene; 1,1-bis (methoxymethyl)-7-(3,3,3-trifluoropropyl) indene; 1,1-bis (methoxymethyl)-7-trimethylsilylindene; 9,9-bis (methoxymethyl)-fluorene; 9,9-bis (methoxymethyl)-2,3,6,7-tetramethylfluorene; 9,9-bis (methoxymethyl)-2,3,4,5,6,7-hexafluorofluorene; 9,9-bis (methoxymethyl)-2,3-benzofluorene, 9,9-bis (methoxymethyl)-2,7-diisopropylfluorene; 9,9-bis (methoxymethyl)-2,7-dicyclopentylfluorene; 9,9-bis (1'-isopropoxy-n-butyl-4,5-diphenylfluorene; 9,9-bis (1'-methoxyethyl)fluorene; 9-methoxymethyl-9-pentoxymethylfluorene; 9-methoxymethyl-9-ethoxymethylfluorene; 9-methoxymethyl-9-(1'-methoxyethyl)-fluorene; 1,1-bis (methoxymethyl)-2,5-cyclohexadiene, 1,1-bis (methoxymethyl) benzonaphthene; 9,9-bis(methoxymethyl)-1,4-methanedihydronaphthalene; and 9,9-bis (methoxymethyl)-9,10-dihydroanthracene.

9. The process as claimed in claim 1, wherein the a least one procatalyst is obtained by treatment of the at least one first internal donor containing morphologically modified magnesium alkoxide with a mixture of titanium tetrahalide and the at least one second internal donor or with a mixture of titanium tetrahalide and an organic acid chloride that generates said second internal donor in-situ.

10. The process as claimed in claim 1, wherein the at least one second internal donor is at least one ester selected from the group consisting of organic acid esters having 2 to about 30 carbon atoms; said organic acid ester being selected from the group of compounds consisting of ethyl benzoate, n-butyl benzoate, p-methoxy ethylbenzoate, p-ethoxy ethylbenzoate, iso butyl benzoate, ethyl p-toluate, diethyl phthalate, di-n-propyl phthalate, di-n-butyl phthalate, di-n-pentyl phthalate, di-i-pentyl phthalate, bis (2-ethylhexyl)phthalate, ethyl-isobutyl phthalate, ethyl-n-butyl phthalate, di-n-hexyl phthalate, and di-isobutyl phthalate.

11. The process as claimed in claim 1, wherein the at least one first internal donor is 9, 9-bis (methoxymethyl) fluorene and the at least one second internal donor is ethyl benzoate.

12. The process as claimed in claim 1, wherein said at least one organoaluminum compound is at least one selected from the group consisting of triethyl aluminum, tridecylaluminum, tri-n-butyl aluminum, tri-isopropyl aluminum, tri-isoprenyl aluminum, tri-isobutyl aluminum hydride, ethyl aluminumsesquichloride, diethyl aluminum chloride, di-isobutyl aluminum chloride, triphenyl aluminum, and tri-n-octyl aluminum.

13. The process as claimed in claim 1, wherein the at least one organoaluminum compound is triethyl aluminum.

14. The process as claimed in claim 1, wherein the organosilane compound is at least one selected from the group consisting of diphenyl dimethoxy silane, phenyl trimethoxy silane, phenyl ethyl dimethoxy silane, phenyl methyl dimethoxy silane, trimethyl methoxy silane, isobutyl trimethoxy silane, diisobutyl methoxy silane, dicyclopentyldimethoxy silane, di-t-butyl dimethoxy silane, dicyclopentyl dimethoxy silane, cyclohexyl methyl di methoxy silane and dicyclo hexyl dimethoxy silane.

15. The process as claimed in claim 1, wherein the carboxylic acid ester is at least one selected from the group consisting of C1-4 alkyl benzoates and C1-4 ring alkylated derivatives thereof, selected from the group consisting of methyl benzoate, ethyl benzoate, propyl benzoate, methyl p-methoxybenzoate, methyl p-ethoxybenzoate, ethyl p-methoxybenzoate, ethyl p-ethoxybenzoate and p-iso propoxy ethyl benzoate.

16. The process as claimed in claim 15, wherein the carboxylic acid ester is at least one selected from ethyl benzoate, ethyl p-ethoxybenzoate, and p-iso propoxy ethyl benzoate.

17. The process as claimed in claim 1, wherein the at least one hydrocarbon medium is at least one selected from the group consisting of pentane, hexane, heptane, octane, nonane, decane, mineral oil and turpentine.

18. The process as claimed in claim 1, wherein the at least one hydrocarbon medium is hexane.

19. The process as claimed in claim 1, wherein the at least one monomer is propylene.

* * * * *

UNITED STATES PATENT AND TRADEMARK OFFICE
CERTIFICATE OF CORRECTION

PATENT NO. : 10,364,305 B2
APPLICATION NO. : 15/311983
DATED : July 30, 2019
INVENTOR(S) : Virendrakumar Gupta et al.

It is certified that error appears in the above-identified patent and that said Letters Patent is hereby corrected as shown below:

In the Claims

At Column 11, Line 14, change "cyclohexyl methyl di methoxy" to --cyclohexyl methyl dimethoxy--

Signed and Sealed this
Fourteenth Day of April, 2020

Andrei Iancu
*Director of the United States Patent and Trademark Office*